(12) United States Patent
Miyamoto et al.

(10) Patent No.: US 11,146,702 B2
(45) Date of Patent: Oct. 12, 2021

(54) RECORDING APPARATUS

(71) Applicant: SEIKO EPSON CORPORATION, Tokyo (JP)

(72) Inventors: Shintaro Miyamoto, Shiojiri (JP); Keisuke Sasaki, Matsumoto (JP); Koichi Kikuchi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/855,389

(22) Filed: Apr. 22, 2020

(65) Prior Publication Data

US 2020/0344370 A1 Oct. 29, 2020

(30) Foreign Application Priority Data

Apr. 24, 2019 (JP) .............................. JP2019-082693

(51) Int. Cl.
*H04N 1/04* (2006.01)
*H04N 1/00* (2006.01)

(52) U.S. Cl.
CPC ..... *H04N 1/00525* (2013.01); *H04N 1/00602* (2013.01); *H04N 1/00604* (2013.01); *H04N 1/00795* (2013.01)

(58) Field of Classification Search
CPC ........... H04N 1/00533; H04N 1/00554; H04N 1/00559; H04N 1/0079; H04N 2201/0096
See application file for complete search history.

(56) References Cited

U.S. PATENT DOCUMENTS

| 5,355,195 A | * | 10/1994 | Miyamoto | G03B 27/6228 355/75 |
| 6,281,980 B1 | * | 8/2001 | Maemura | H04N 1/00912 358/1.13 |
| 7,265,879 B2 | * | 9/2007 | Mui | H04N 1/0032 358/486 |
| 2003/0095296 A1 | * | 5/2003 | Terashima | H04N 1/00713 358/498 |
| 2006/0115059 A1 | * | 6/2006 | Nobe | H04N 1/00525 379/100.01 |
| 2008/0001343 A1 | * | 1/2008 | Kato | H04N 1/00525 271/3.14 |

(Continued)

FOREIGN PATENT DOCUMENTS

| CN | 102447805 | 5/2012 |
| JP | 2002-247284 | 8/2002 |
| JP | 2012-085023 | 4/2012 |

*Primary Examiner* — Cheukfan Lee
(74) *Attorney, Agent, or Firm* — Workman Nydegger

(57) ABSTRACT

A recording apparatus includes: an apparatus main body having a recording unit that performs recording onto a recording medium; and a document reading mechanism unit having a reading unit that reads a document and a document transport unit that transports a document to the reading unit, the document reading mechanism unit being provided in an upper part of the apparatus main body, wherein the apparatus main body includes: a feed roller that feeds the recording medium toward the front of the apparatus; and a frame having a frame surface intersecting the horizontal direction, the frame being located between the feed roller and the recording unit in an apparatus depth direction, and a part of the document reading mechanism unit overlaps the feed roller in the apparatus depth direction, and overlaps the frame in the vertical direction.

10 Claims, 13 Drawing Sheets

(56) References Cited

U.S. PATENT DOCUMENTS

| | | | |
|---|---|---|---|
| 2008/0204485 A1* | 8/2008 | Matsumoto | B41J 2/16517 347/5 |
| 2012/0086967 A1 | 4/2012 | Miyagawa et al. | |
| 2014/0376014 A1 | 12/2014 | Hatayama et al. | |
| 2015/0201096 A1* | 7/2015 | Shimazu | H04N 1/00278 358/1.13 |
| 2017/0361634 A1 | 12/2017 | Shirota et al. | |
| 2018/0009226 A1* | 1/2018 | Shimazu | B41J 2/16517 |
| 2018/0093499 A1* | 4/2018 | Shirane | B41J 2/01 |
| 2020/0344370 A1* | 10/2020 | Miyamoto | H04N 1/00525 |
| 2020/0369057 A1* | 11/2020 | Sasaki | B41J 13/10 |

\* cited by examiner

RECORDING APPARATUS

The present application is based on, and claims priority from JP Application Serial Number 2019-082693, filed Apr. 24, 2019, the disclosure of which is hereby incorporated by reference herein in its entirety.

BACKGROUND

1. Technical Field

The present disclosure relates to a recording apparatus having a document reading mechanism unit for reading a document.

2. Related Art

A recording apparatus having a document reading function of reading a document in addition to a recording function of performing recording on a medium has been known and may be called a multifunction machine. Such a recording apparatus is disclosed, for example, in JP-A-2002-247284.

An image forming apparatus, which is an example of the multifunction machine disclosed in JP-A-2002-247284, includes a recording system as a recording apparatus and a reading system for reading a document image on a document. The reading system is provided at a position closer to the front of the apparatus than the recording system is. For this reason, the image forming apparatus disclosed in JP-A-2002-247284 has a structure that necessarily involves an increase in the dimension in the apparatus depth direction. This structure is not suitable for meeting the demand for downsizing.

SUMMARY

According to an aspect of the present disclosure, a recording apparatus includes: an apparatus main body having a recording unit that performs recording onto a recording medium; and a document reading mechanism unit having a reading unit that reads a document and a document transport unit that transports a document to the reading unit, the document reading mechanism unit being provided in an upper part of the apparatus main body, wherein the apparatus main body includes: a feed roller that feeds the recording medium toward the front of the apparatus; and a frame having a frame surface intersecting the horizontal direction, the frame being located between the feed roller and the recording unit in an apparatus depth direction, and a part of the document reading mechanism unit overlaps the feed roller in the apparatus depth direction, and overlaps the frame in the vertical direction.

DESCRIPTION OF EXEMPLARY EMBODIMENTS

Figure 1:
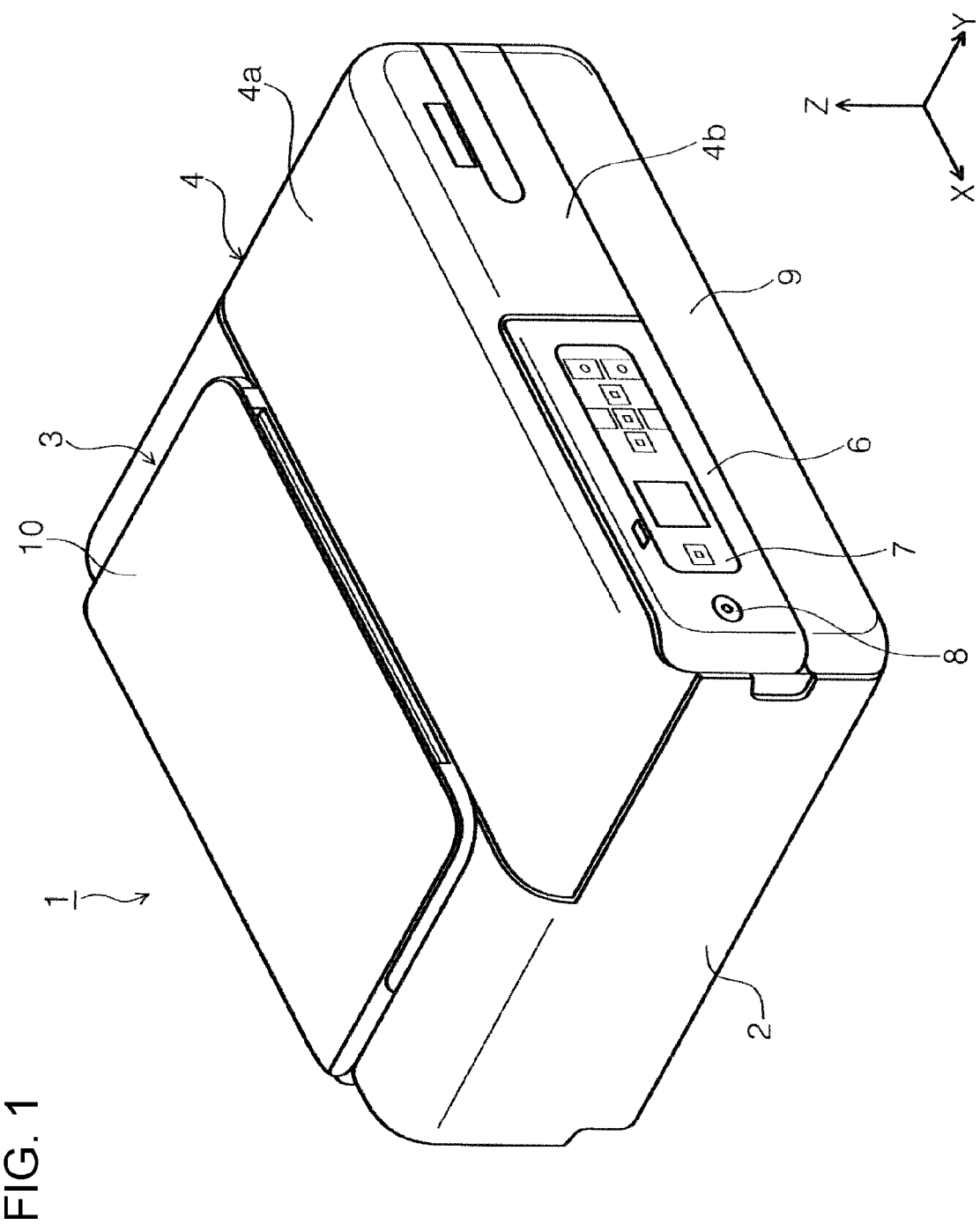
FIG. 1 is an appearance perspective view of a printer with an openable cover being closed.

The present disclosure will be schematically described. A recording apparatus according to a first aspect includes: an apparatus main body having a recording unit that performs recording onto a recording medium; and a document reading mechanism unit having a reading unit that reads a document and a document transport unit that transports a document to the reading unit, the document reading mechanism unit being provided in an upper part of the apparatus main body, wherein the apparatus main body includes: a feed roller that feeds the recording medium toward the front of the apparatus; and a frame having a frame surface intersecting the horizontal direction, the frame being located between the recording unit and the feed roller in an apparatus depth direction, and a part of the document reading mechanism unit overlaps the feed roller in the apparatus depth direction, and overlaps the frame in the vertical direction.

According to this aspect, a part of the document reading mechanism unit overlaps the feed roller in the apparatus depth direction, and overlaps the frame in the vertical direction. Accordingly, the dimension of the entire recording apparatus in the apparatus depth direction as well as the dimension in the apparatus height direction can be reduced to thereby meet the demand for downsizing.

In a second aspect, according to the first aspect, the recording unit is provided in a carriage that is movable in a width direction, which is a direction intersecting a transport direction of the recording medium, and the frame supports the carriage. According to this aspect, the advantageous effect of the first aspect can be obtained in the configuration in which the recording unit is provided in a carriage that is movable in a width direction, which is a direction intersecting a transport direction of the recording medium, and the frame supports the carriage.

In a third aspect, according to the first or second aspect, the reading unit overlaps the feed roller in the apparatus depth direction, and overlaps the frame in the vertical direction.

According to this aspect, the advantageous effect of the first aspect can be obtained in the configuration in which the reading unit overlaps the feed roller in the apparatus depth direction, and overlaps the frame in the vertical direction.

In a fourth aspect, according to the third aspect, the reading unit includes a substrate on which a light emitting element and a light receiving element are provided, and the substrate overlaps the feed roller in the apparatus depth direction, and overlaps the frame in the vertical direction.

According to this aspect, the reading unit includes a substrate on which a light emitting element and a light receiving element are provided, and the substrate overlaps the feed roller in the apparatus depth direction, and overlaps the frame in the vertical direction. Accordingly, a range of the document reading mechanism unit that overlaps the frame in the vertical direction is increased, and the dimension of the apparatus in the vertical direction can be further reduced.

In a fifth aspect, according to the first or second aspect, the document reading mechanism unit includes a holding member that holds the reading unit, and the holding member overlaps the feed roller in the apparatus depth direction, and overlaps the frame in the vertical direction.

According to this aspect, the advantageous effect of the first aspect can be obtained in the configuration in which the document reading mechanism unit includes a holding member that holds the reading unit, and the holding member overlaps the feed roller in the apparatus depth direction, and overlaps the frame in the vertical direction.

In a sixth aspect, according to the fifth aspect, the document reading mechanism unit includes an output document receiving tray that receives the document that is read and outputted, and a lowermost part of the holding member in the vertical direction is located under a document receiving surface of the output document receiving tray.

According to this aspect, the advantageous effect of the first aspect can be obtained in the configuration in which the document reading mechanism unit includes an output document receiving tray that receives the document that is read and outputted, and a lowermost part of the holding member in the vertical direction is located under a document receiving surface of the output document receiving tray.

In a seventh aspect, according to any one of the first to fifth aspects, the document reading mechanism unit includes an output document receiving tray that receives the document that is read and outputted, the apparatus main body includes a recording medium support tray that supports the recording medium fed by the feed roller in an inclined posture, and a part of the recording medium support tray overlaps the output document receiving tray in the vertical direction. According to this aspect, a part of the recording medium support tray overlaps the output document receiving tray in the vertical direction. Accordingly, the dimension of the apparatus in the vertical direction can be reduced.

In an eighth aspect, according to any one of the first to seventh aspects, the apparatus main body includes a tilt panel on a front of the apparatus, and a part of the document reading mechanism unit overlaps the tilt panel in the vertical direction.

According to this aspect, the apparatus main body includes a tilt panel on a front of the apparatus, and a part of the document reading mechanism unit overlaps the tilt panel in the vertical direction. Accordingly, the dimension of the apparatus in the vertical direction can be reduced.

In a ninth aspect, according to any one of the first to eighth aspects, the document reading mechanism unit includes a document support section that supports the document, the document support section being located upstream in a direction in which a document is transported by the document transport unit, and a top of the apparatus main body forms an extension surface extending a document support surface of the document support section toward the front of the apparatus.

According to this aspect, the document reading mechanism unit includes a document support section that supports the document, the document support section being located upstream in a direction in which a document is transported by the document transport unit, and a top of the apparatus main body forms an extension surface extending a document support surface of the document support section toward the front of the apparatus. Accordingly, since a dedicated member is not required to provide the extension surface, the cost and size of the apparatus can be reduced.

In a tenth aspect, according to the ninth aspect, in the document reading mechanism unit, the document is read by the reading unit while being transported in a direction from the front to the rear of the apparatus main body, and is outputted in the first direction, and, in the apparatus main body, the recording medium is recorded by the recording unit while being transported in a direction from the rear to the front of the apparatus main body, and is outputted to the front of the apparatus main body. According to this aspect, usability in performing various operations from the front of the apparatus main body is improved.

The present disclosure will now be specifically described. Throughout the figures, the X axis direction is an apparatus width direction, in which the −X direction is the right direction as seen from a user facing the front surface of the apparatus, whereas the +X direction is the left direction. Further, the X axis direction is also a direction intersecting a paper sheet transport direction, that is, a paper sheet width direction in a region facing a recording head 22 in an apparatus main body 2, which will be described later. The Y axis direction is an apparatus depth direction, in which the +Y direction is a direction directed from the rear surface to the front surface of the apparatus, whereas the −Y direction is a direction directed from the front surface to the rear surface of the apparatus. In the present embodiment, among a plurality of side surfaces constituting the outer periphery of the apparatus, a side surface on which a tilt panel 6 is provided is the front of the apparatus, whereas the side surface on a side opposite to the front surface is the rear surface of the apparatus. Further, in the Y axis direction, the +Y direction is also the paper sheet transport direction in a region facing the recording head 22 in the apparatus main body 2, which will be described later. The Z axis direction is a vertical direction, in which the +Z direction is a vertically upward direction, whereas the −Z direction is a vertically downward direction.

Figure 2:
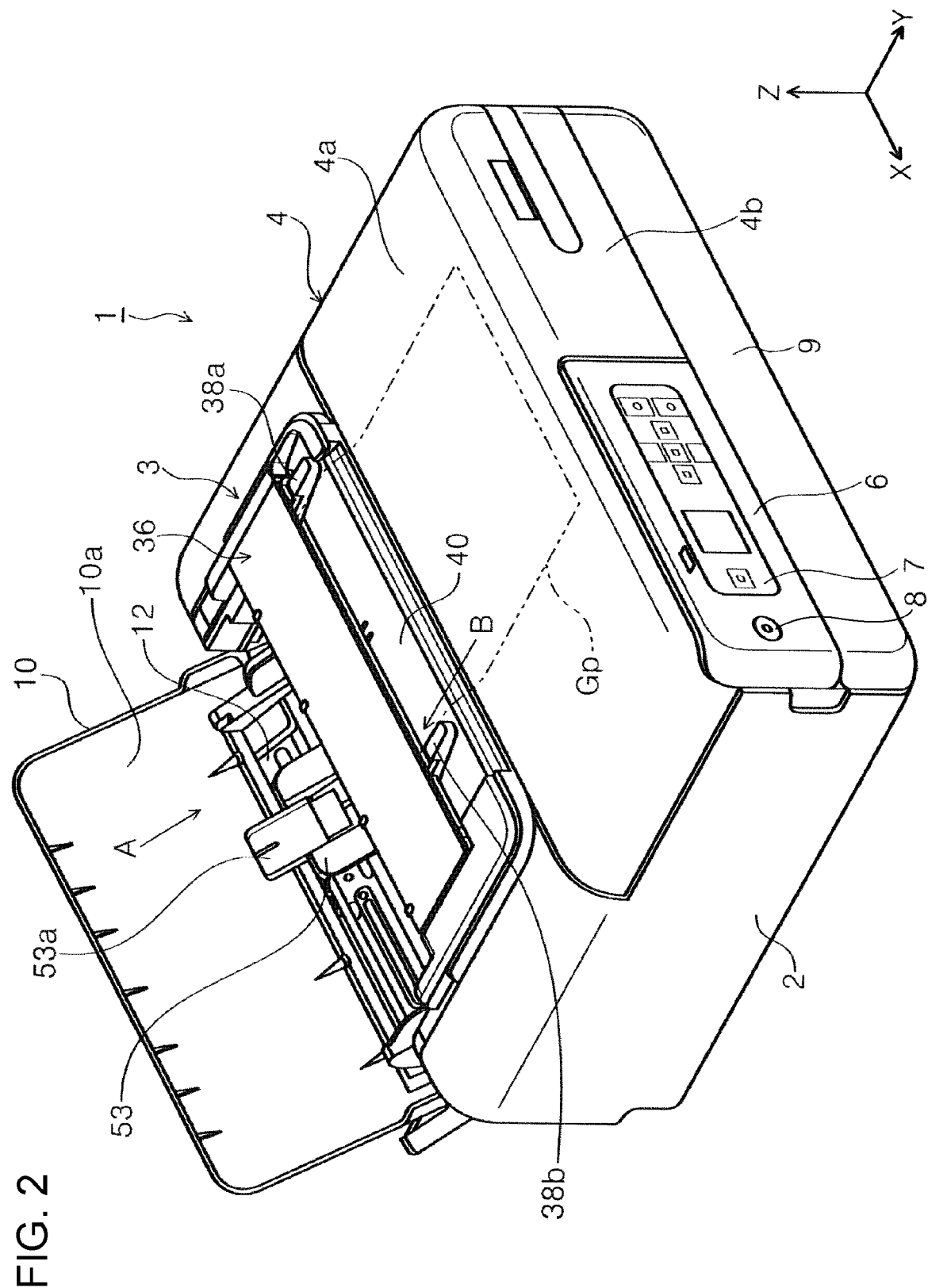
FIG. 2 is an appearance perspective view of a printer with an openable cover being open.

In FIGS. 1 and 2, an ink jet printer 1, which is an example of the recording apparatus, is a multifunction machine in which a reading mechanism unit 3 for reading documents is provided in an upper part of the apparatus main body 2. Hereinafter, the ink jet printer 1 is simply referred to as a printer 1. The apparatus main body 2 has a function of performing recording on a recording paper, which is an example of a recording medium, and the reading mechanism unit 3 has a function of reading a document.

The tilt panel 6, which is provided on the front of the apparatus main body 2, includes a power button 8 for turning on and off the printer 1 and an operation unit 7 for performing various other operations. The tilt panel 6 is tiltable by rotating about a pivot shaft 6a (see FIG. 3). Further, a front cover 9 is provided on the front surface of the apparatus. The front cover 9 is configured to rotate about a pivot shaft 9a (see FIG. 3) to thereby assume a closed state shown in FIGS. 1 and 2 and an open state (not shown) in which an output path for a recording paper is exposed so that a recording paper on which recording is performed can be outputted.

An openable cover 4 forms a front part of the top of the apparatus main body 2. The openable cover 4 is configured to rotate about a pivot shaft, which is not shown, to thereby assume a closed state shown in FIGS. 1 and 2 and an open state (not shown) which exposes the inside of the apparatus main body 2. When the openable cover 4 is open, it is possible, for example, to remove a jammed recording paper or refill an ink tank 21, which will be described later, with ink. A front covering member 4b is integrally formed with the openable cover 4. The front covering member 4b is substantially perpendicular to a top 4a of the openable cover 4. When both the openable cover 4 and the tilt panel 6 are closed, the surface of the front covering member 4b and the surface of the tilt panel 6 are flush with each other as shown in FIGS. 1 and 2.

The front cover 9, which is provided under the tilt panel 6 and the front covering member 4b, is configured to be openable, and FIGS. 1 and 2 show the front cover 9 in the closed state. When the front cover 9 is in the closed state as shown in figure, the surface of the front cover 9, the surface of the front covering member 4b, and the surface of the tilt panel 6 are flush with each other to form a vertical surface. When the front cover 9 is open, an output tray 29 (FIG. 3) for receiving a recording paper outputted toward the front side of the apparatus can be pulled out.

An openable cover 10 is provided on a rear part of the top of the apparatus. The openable cover 10 is configured to rotate about a rotation shaft 10c (see FIGS. 3 and 4) to assume a closed state shown in FIGS. 1 and 3 and an open state shown in FIGS. 2 and 4. When the openable cover 10 is open, the reading mechanism unit 3 is exposed as shown in FIG. 2 so that a document can be read. Further, when the openable cover 10 is open, a recording paper can be set on a support member 12, which will be described later. In FIG. 2, the arrow A indicates a direction in which a recording paper is set.

Next, with reference to FIGS. 3 and 4, a transport path for a recording paper in the apparatus main body 2 will be described. The support member 12 is provided in the rear part of the apparatus such that a recording paper before feeding is supported in an inclined posture by the support member 12 and a paper sheet support surface 10a formed by the rear surface of the openable cover 10 in the open state. The support member 12 is configured to be swingable about a swing shaft, which is not shown, to thereby feed the recording paper supported with respect to a feed roller 13.

The feed roller 13 is driven to rotate by a motor (not shown) to thereby feed a recording paper to a downstream part. A separation roller 14 to which rotation resistance is imparted is provided at a position facing the feed roller 13. The separation roller 14 cooperates with the feed roller 13 to form a nip area therebetween to thereby prevent double feeding of recording papers. In FIG. 4, the dot-dot-dashed line denoted by reference numeral Pd indicates a transport trajectory of the recording paper fed out and transported by the feed roller 13.

The recording paper fed out by the feed roller 13 reaches a transport roller pair 17. The transport roller pair 17 is composed of a driving roller 18 driven by a driving source, which is not shown, and a driven roller 19 driven to rotate by the driving roller 18. A recording paper is nipped between these rollers, and is fed to an area facing the recording head 22, that is, a recording area where recording is performed.

A carriage 20 having a recording head 22 reciprocates in the X axis direction by a driving source, which is not shown, while being guided by a main frame 24 extending in the X axis direction. As the carriage 20 moves, the recording head 22 ejects ink onto a recording paper. The ink tank 21 is mounted in the carriage 20, and ink is supplied from the ink tank 21 to the recording head 22. In the present embodiment, the ink tank 21 has an ink supply port (not shown) so that ink tank 21 can be refilled with ink via the ink supply port.

Figure 3:
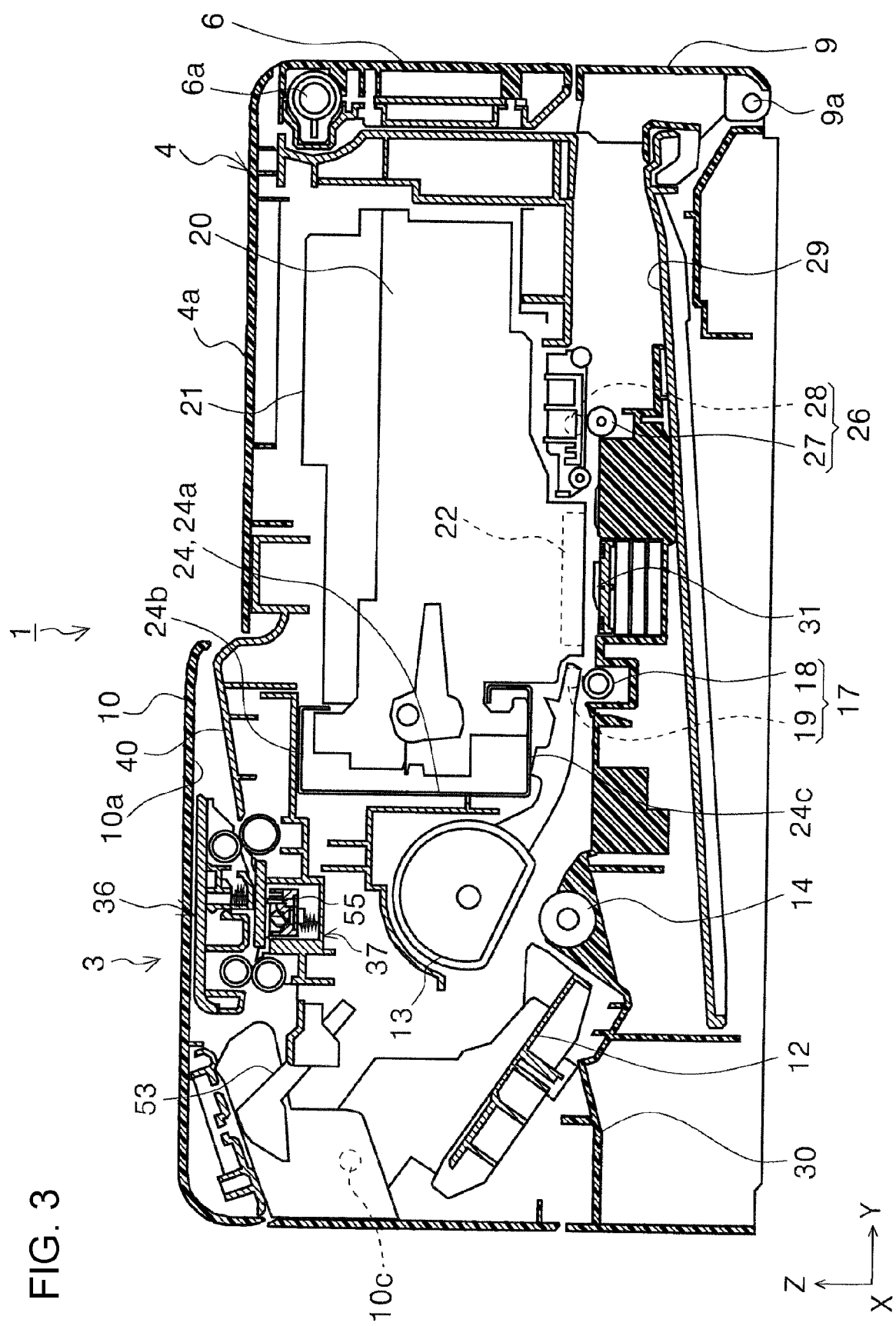
FIG. 3 is a side cross-sectional view of a printer with an openable cover being closed.
Figure 4:
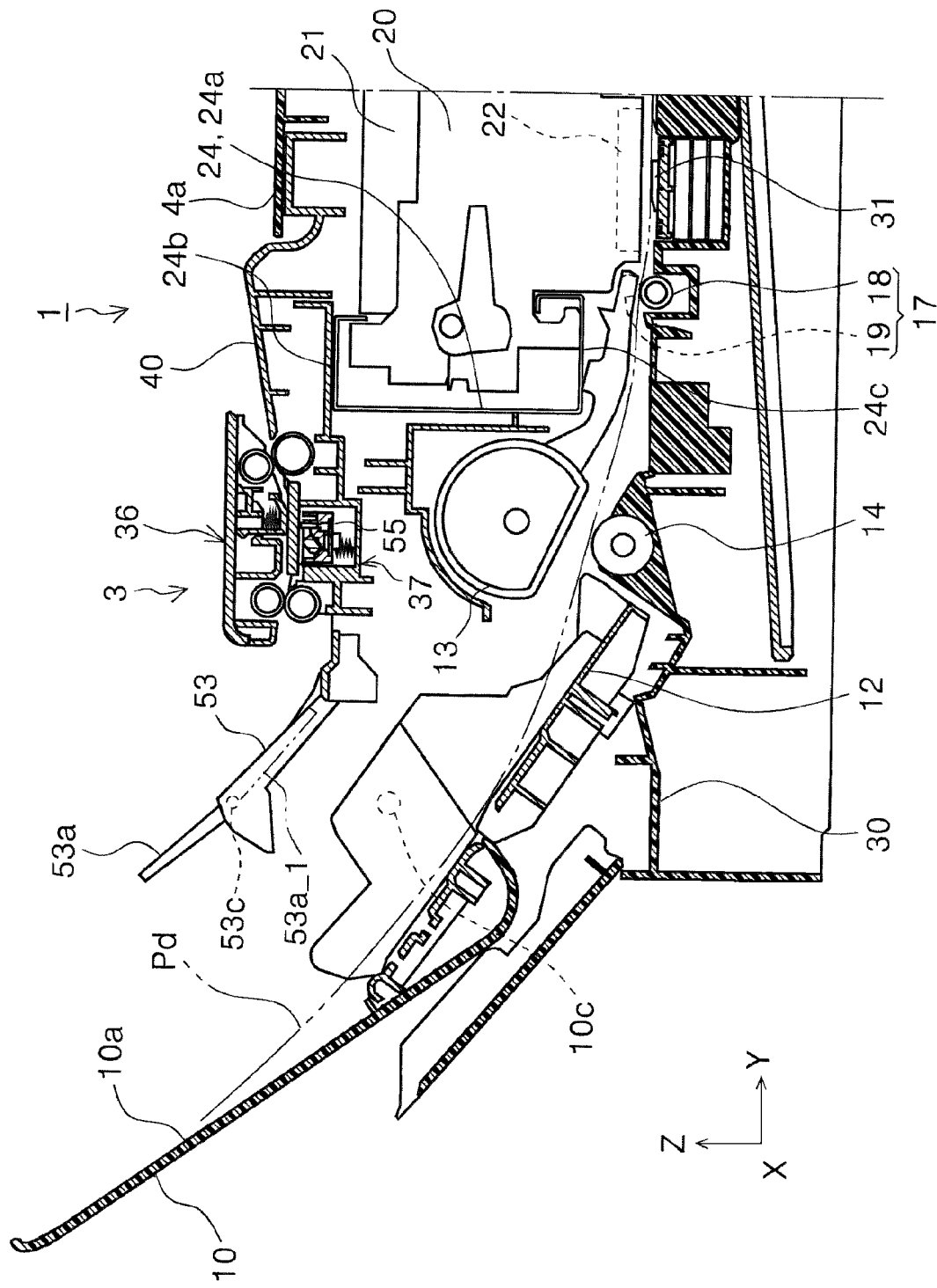
FIG. 4 is a side cross-sectional view of a printer with an openable cover being open.

The main frame 24 is made of a metal plate material, and, as shown in FIGS. 3 and 4 in side view, has a vertical section 24a constituting a frame surface that intersects the horizontal direction, a first horizontal section 24b formed by bending an upper part of the vertical section 24a, and a second horizontal section 24c formed by bending a lower part of the vertical section 24a. The vertical section 24a of the present embodiment extends along a vertical plane. The first horizontal section 24b and the second horizontal section 24c of the present embodiment extends along a horizontal plane. In the main frame 24, the +Y end of the first horizontal section 24b is bent in the −Z direction, and the +Y end of the second horizontal section 24c is bent in the +Z direction and further slightly bent in the −Y direction to form a space of a generally rectangular shape in side view. A portion of the carriage 20 is located in this space so that the portion is guided by the main frame 24 in the X axis direction.

A support rib 31 is provided at a position facing the recording head 22, and a recording paper on which recording is performed by the recording head 22 is supported by the support rib 31. An output roller pair 26 for outputting a recording paper on which recording has been performed toward the front of the apparatus is provided downstream of the support member 12 in the transport direction. The output roller pair 26 is composed of a driving roller 27 driven by a driving source, which is not shown, and a driven roller 28 driven to rotate by the driving roller 27. A recording paper is nipped between these rollers, outputted toward the front of the apparatus, and supported by the output tray 29 in a pulled-out state.

The configuration of the apparatus main body 2 has been described above. The reading mechanism unit 3 provided in the upper part of the apparatus main body 2 will now be described with reference to FIG. 5. The reading mechanism unit 3 is composed of an input tray 40, an upper unit 36, a lower unit 37, and an output tray 53.

A leading end of the document to be read is supported by the input tray 40, and a trailing end is supported by the top 4a (see FIG. 2) of the openable cover 4 (see FIG. 2). The arrow B in FIG. 2 indicates a direction in which the document to be read is set. Further, reference numeral Gp in FIG. 2 indicates the set document supported by the input tray 40 and the top 4a of the apparatus main body 2. Further, reference numerals 38a and 38b in FIG. 2 indicate edge guides that guide the side edges of the set document. Referring back to FIG. 5, the document transport direction during reading of the document in the reading mechanism unit 3 is substantially the −Y direction, and a transport roller pair 41 is provided downstream of the input tray 40 in the document transport direction. The transport roller pair 41 is composed of a driving roller 42 driven by a driving source, which is not shown, and a driven roller 43 driven to rotate by the driving roller 42. The document is nipped between these rollers, and is fed downstream in the document transport direction.

A reading glass 58 is provided downstream of the transport roller pair 41 in the document transport direction, and a sensor module 55, which is a reading unit, is provided under the reading glass 58. The sensor module 55 extends in the X axis direction, and is pressed against the underside of the reading glass 58 from the lower side of the reading glass 58 by the pressing spring 57. The sensor module 55 can employ a charge coupled device type (CCD type) or a contact image sensor type (CIS type). In the present embodiment, the contact image sensor type (CIS type) is employed.

Reference numeral 56 is a circuit board on which a light receiving element (not shown) and a light emitting element (not shown) are provided. The sensor module 55 is held by the holding frame 54, and the holding frame 54 forms a base body of the lower unit 37 and forms the lowermost surface of the lower unit 37.

A pressing member 45 is provided above the reading glass 58. The pressing member 45 is pressed toward the reading glass 58 by a compression spring 46. The document transported by the transport roller pair 41 is read by the sensor module 55 while being held between the pressing member 45 and the reading glass 58. The driven roller 43, the pressing member 45, the compression spring 46, and the driven roller 50 are provided on the holding frame 51 that forms a base body of the upper unit 36.

An output roller pair 48 for outputting the document on which reading is performed is provided downstream of the reading glass 58. The output roller pair 48 is composed of a driving roller 49 driven by a driving source, which is not shown, and a driven roller 50 driven to rotate by the driving roller 49. The document that has been read is nipped between these rollers, and outputted toward the output tray 53. Reference numeral Gp indicates a path of the document that has been set, read, and outputted.

The output tray 53 as an output document receiving tray is configured to be switchable by an operation of a user between a non-expanded state shown in FIG. 3 and an expanded state shown in FIGS. 4 and 2. Further, a sub tray 53a (see FIG. 2) is configured to be expandable. The sub tray 53a can assume an expanded state indicated by the solid line in FIG. 4 and a housed state indicated by the dot-dot-dashed line and reference numeral 53a_1 by rotating about a rotation shaft 53c in the clockwise direction and the counterclockwise direction in FIG. 4. When a long document is ejected, the leading edge of the document goes beyond the output tray 53 and is supported by the paper sheet support surface 10a (see FIG. 2) located behind the output tray 53.

The driven roller 43, the pressing member 45, the compression spring 46, the driven roller 50, and the holding frame 51 described above form the upper unit 36. The upper unit 36 is rotatable about a pivot shaft (not shown) with respect to the lower unit 37. When the upper unit 36 is opened, the nipping state of document by the transport roller pair 41 and the output roller pair 48 can be released. Further, the driving roller 42, the sensor module 55, the driving roller 49, and the holding frame 54 described above form the lower unit 37.

Next, a characteristic configuration of the printer 1 of the present embodiment will now be described mainly with reference to FIG. 5. As described above, the printer 1 includes the apparatus main body 2 having the recording head 22 as a recording unit for performing recording onto a recording paper, and the reading mechanism unit 3 provided in the upper part of the apparatus main body 2 and having the sensor module 55 as a reading unit for reading a document and the transport roller pair 41 as a document transport unit for transporting the document to the sensor module 55. The apparatus main body 2 includes the feed roller 13 for feeding a recording paper in the +Y direction toward the front of the apparatus, and the main frame 24 having a frame surface extending in the Z axis direction, which is the vertical direction, and is located at a position between the feed roller 13 and the recording head 22 in the Y axis direction, which is the apparatus depth direction. A part of the reading mechanism unit 3 overlaps the feed roller 13 in the Y axis direction, and overlaps the main frame 24 in the Z axis direction.

Figure 5:
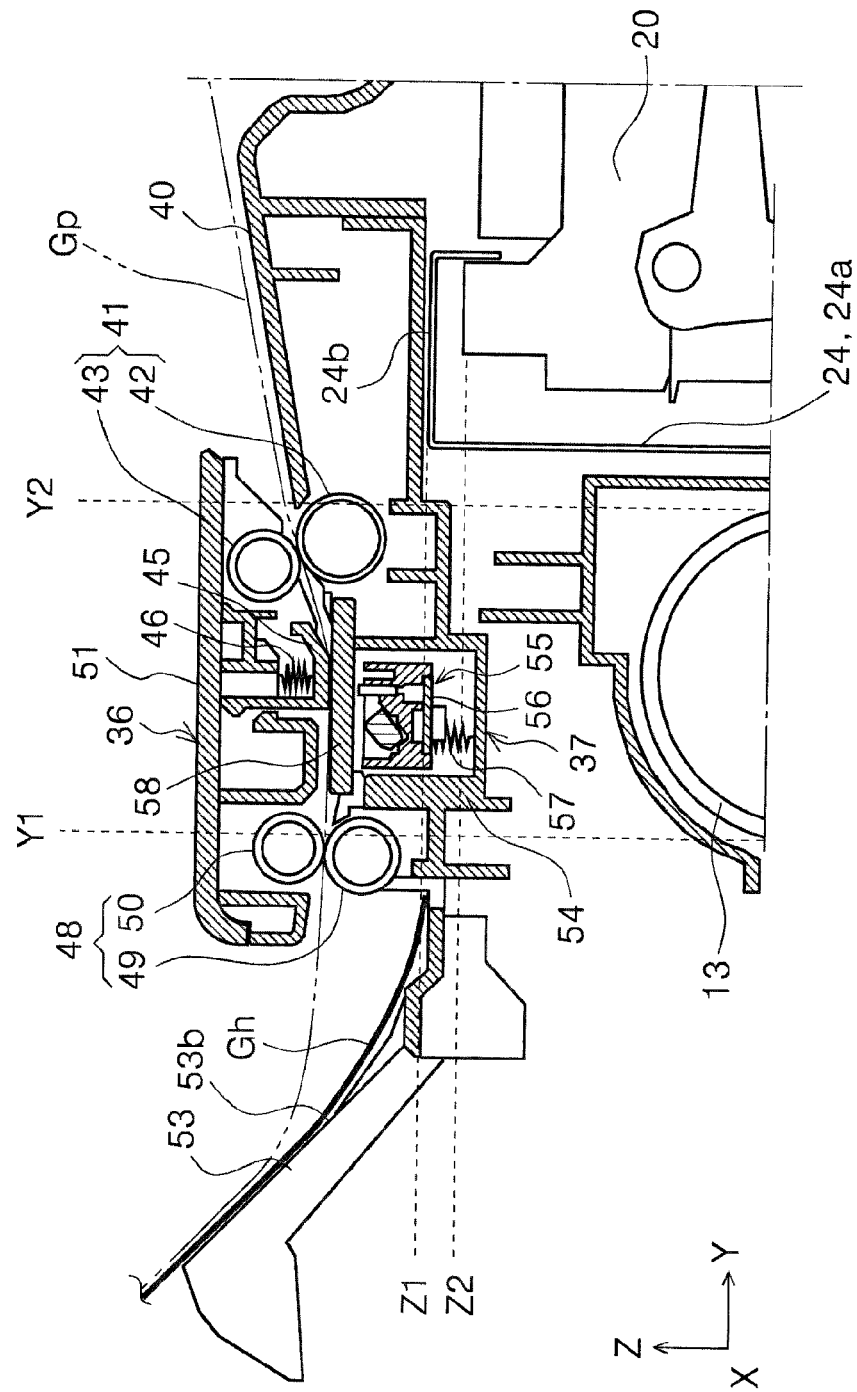
FIG. 5 is a partial enlarged view of FIG. 4.

In FIG. 5, a position Y1 is an end position of the outer periphery of the feed roller 13 in the −Y direction, and a position Y2 is an end position of the outer periphery of the feed roller 13 in the +Y direction. Further, a position Z1 is the highest position of the main frame 24 in the +Z direction, and more specifically, the position of the upper surface of the first horizontal section 24b. As seen from FIG. 5, a part of the reading mechanism unit 3, especially of the holding frame 54, and the entire sensor module 55 are disposed between the position Y1 and the position Y2 in the Y axis direction. Further, the entire reading glass 58 is also disposed between the position Y1 and the position Y2. Further, a part of the reading mechanism unit 3, especially of the holding frame 54, and the circuit board 56 that constitutes the sensor module 55 are disposed under the position Z1 in the Z axis direction.

In the present embodiment, a part of the holding frame 54 overlaps the feed roller 13 in the Y axis direction, and overlaps the main frame 24 in the Z axis direction. With this configuration, the dimension of the entire printer 1 in the Y axis direction as well as the dimension in the Z axis direction can be reduced to thereby meet the demand for downsizing. Further, in the present embodiment, a part of the sensor module 55 also overlaps the feed roller 13 in the Y axis direction, and overlaps the main frame 24 in the Z axis direction. In the present specification, the description that two portions overlap in the Y axis direction means that two portions are located in the same region in the Y axis direction. Similarly, the description that two portions overlap in the Z axis direction means that two portions are located in the same region in the Z axis direction. In other words, the description that two portions overlap in the Y axis direction means that two portions overlap each other when viewed in the Z axis direction. Further, the description that two portions overlap in the Z axis direction means that two portions overlap each other when viewed in the Y axis direction.

In the present embodiment, a part of the holding frame 54 is located under a position Z2 in the Z axis direction, and the position Z2 is the highest position of the carriage 20 in the +Z direction. Accordingly, the dimension of the entire apparatus in the Z axis direction can be further reduced.

Further, the recording head 22 is provided in the carriage 20, which is movable in a direction intersecting the paper sheet transport direction, that is, in the X axis direction which is the paper sheet width direction, and the main frame 24 supports the carriage 20.

Further, in the present embodiment, a part of the reading mechanism unit 3 that overlaps the feed roller 13 in the Y axis direction and overlaps the main frame 24 in the Z axis direction is the sensor module 55. A part of the sensor module 55 overlaps the feed roller 13 in the Y axis direction, and overlaps the main frame 24 in the Z axis direction.

Further, the sensor module 55 includes a circuit board 56 on which a light emitting element and a light receiving element (not shown) are disposed, and a part of the reading mechanism unit 3 that overlaps the feed roller 13 in the Y axis direction and overlaps the main frame 24 in the Z axis direction is the circuit board 56. A part of the circuit board 56 overlaps the feed roller 13 in the Y axis direction, and overlaps the main frame 24 in the Z axis direction. Accordingly, a range of the reading mechanism unit 3 that overlaps the main frame 24 in the Z axis direction is increased, and the dimension of the apparatus in the Z axis direction can be further reduced.

Further, a part of the reading mechanism unit 3 that overlaps the feed roller 13 in the Y axis direction and overlaps the main frame 24 in the Z axis direction is a sensor frame 54, which is a holding member that holds the sensor module 55. A part of the holding frame 54 overlaps the feed roller 13 in the Y axis direction, and overlaps the frame in the Z axis direction.

The reading mechanism unit 3 includes the output tray 53 as an output document receiving tray that receives a document that is read and outputted, and the lowermost part of the holding frame 54 in the Z axis direction is located under a document receiving surface 53b of the output tray 53. In FIG. 5, the solid line denoted by reference numeral Gh indicates the document supported by the output tray 53.

Further, the apparatus main body 2 includes the openable cover 10 as a medium support tray for supporting a recording paper in an inclined posture, which is fed by the feed roller 13 as shown in FIG. 4, and a part of the openable cover 10 in the open state overlaps the output tray 53 in the Z axis direction. Further, the apparatus main body 2 includes the tilt panel 6 on the front of the apparatus as shown in FIG. 3, and a part of the reading mechanism unit 3 overlaps the tilt panel 6 in the Z axis direction.

Further, the reading mechanism unit 3 includes the input tray 40 as a document support section for supporting a document at a position upstream in the direction in which a document is transported by the transport roller pair 41, and, as shown in FIG. 2, the top 4a of the apparatus main body 2 forms an extension surface that extends the document support surface of the input tray 40 in the +Y direction toward the front of the apparatus. Accordingly, since a dedicated member is not required to provide the extension surface, the cost and size of the apparatus can be reduced.

In the reading mechanism unit 3, the transport roller pair 41 is configured to transport a document in a direction from the front to the rear of the apparatus main body 2, that is, in the −Y direction, and, in the apparatus main body 2, a recording paper is transported in a direction from the rear to the front of the apparatus main body 2, that is, in the +Y direction, while being recorded by the recording head 22, and outputted in a direction from the rear to the front of the apparatus, that is, in the +Y direction. This configuration improves usability in performing various operations from the front of the apparatus main body 2. The various operations herein include, for example, setting of a document in the reading mechanism unit 3, picking up of the outputted document which has been read, setting of a recording paper in the apparatus main body 2, and picking up of the outputted recording paper after recording is performed.

Figure 6:
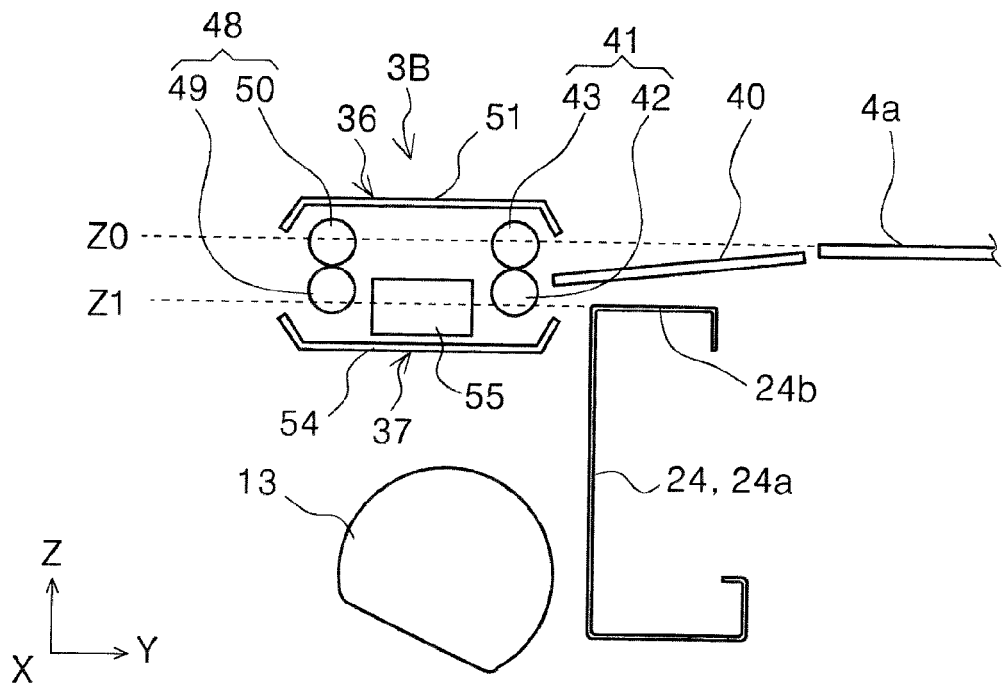
FIG. 6 is a diagram illustrating another embodiment of a reading mechanism unit.
Figure 7:
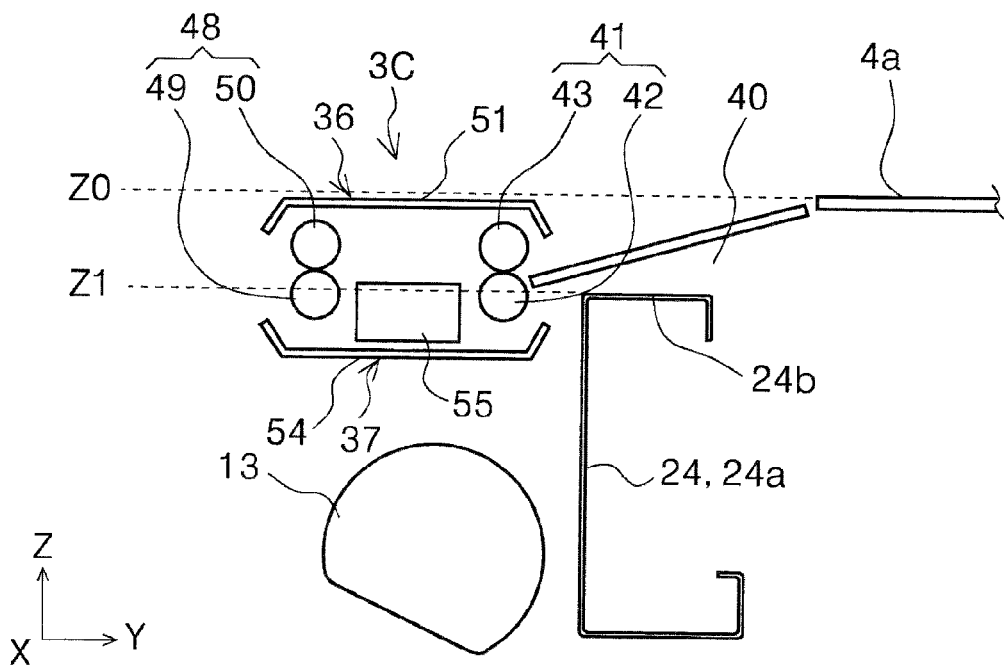
FIG. 7 is a diagram illustrating another embodiment of a reading mechanism unit.
Figure 8:
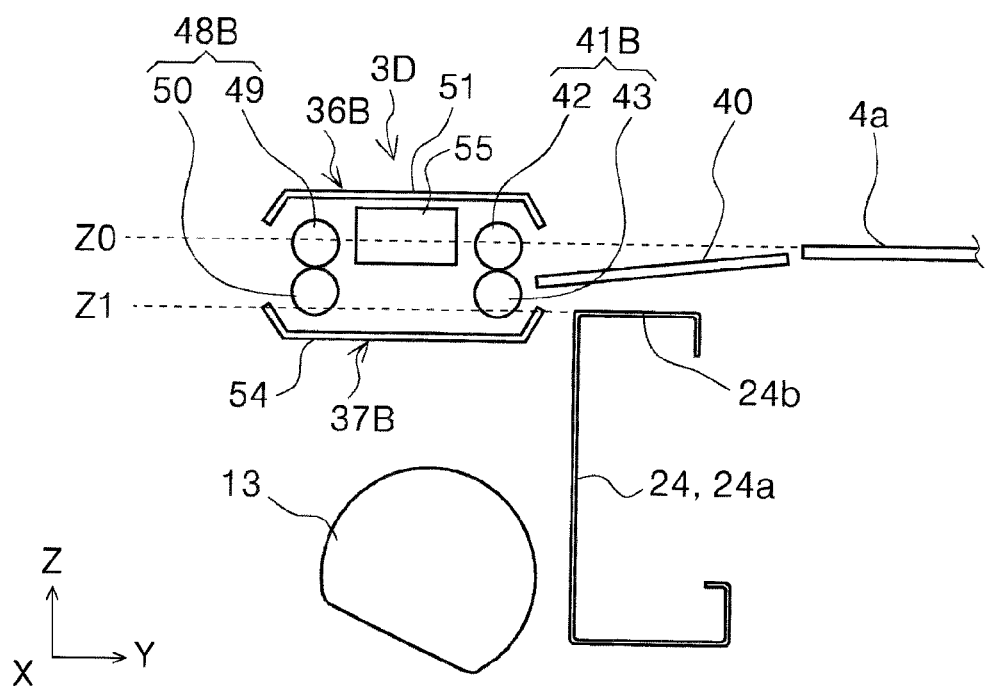
FIG. 8 is a diagram illustrating another embodiment of a reading mechanism unit.

The reading mechanism unit may also be arranged as shown in FIGS. 6 to 8 in the apparatus main body. FIGS. 6 to 8 are diagrams schematically illustrating other embodiments of the reading mechanism unit. In a reading mechanism unit 3B shown in FIG. 6, a part of the driving roller 42 and a part of the driving roller 49 are located under the position Z1, which is the highest position of the main frame 24 in the +Z direction. That is, a part of the reading mechanism unit 3B is located further inside the space provided behind the main frame 24, which enables further reduction of the dimension in the Z axis direction.

In a reading mechanism unit 3C shown in FIG. 7, the holding frame 51 constituting the upper unit 36 is located under a position Z0, which is a position of the top 4a of the openable cover 4 in the Z axis direction. That is, a part of the reading mechanism unit 3C is located further inside the space provided behind the main frame 24, which enables further reduction of the dimension in the Z axis direction. The top of the holding frame 51 may also be located at the same position as the position Z0 in the Z axis direction.

A reading mechanism unit 3D shown in FIG. 8 differs from the above embodiments in that the sensor module 55 is provided in the upper unit 36B. Further, a transport roller pair 41B differs from the above transport roller pair 41 in that the driving roller 42 is provided on the upper side and the driven roller 43 is provided on the lower side. Similarly, an output roller pair 48B differs from the above output roller pair 48 in that the driving roller 49 is provided on the upper side and the driven roller 50 is provided on the lower side. That is, a lower unit 37B includes the driven rollers 43 and 50, and the upper unit 36B includes the driving rollers 42 and 49. With this configuration as well, a part of the reading mechanism unit 3D overlaps the feed roller 13 in the Y axis direction, and overlaps the main frame 24 in the Z axis direction. In the aforementioned embodiments, a single sensor module 55 is provided on either the upper side or the lower side of the document transport path. However, the sensor modules 55 may also be provided on both the upper and lower sides of the document transport path to read the both surfaces of the document.

Figure 9:
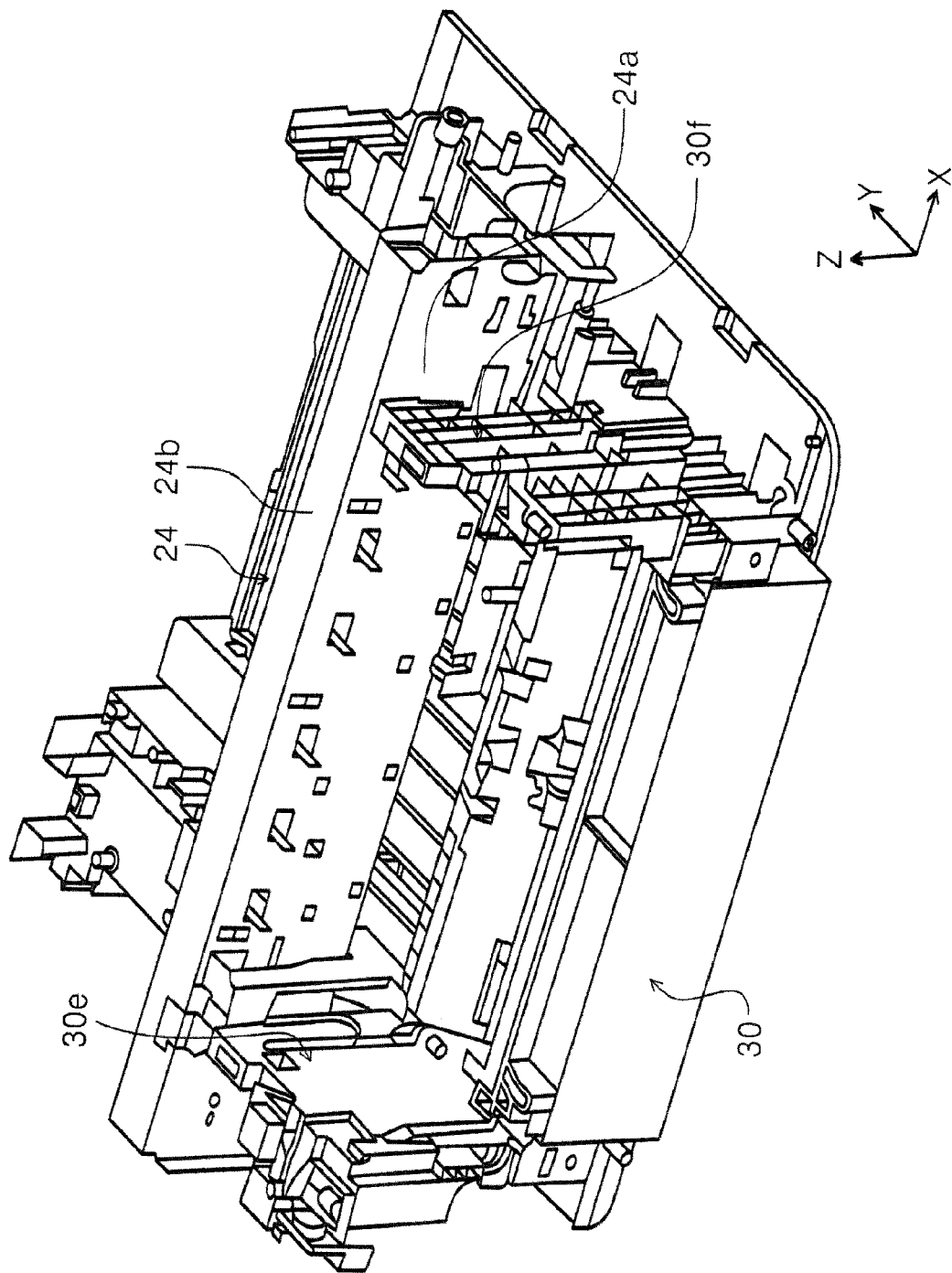
FIG. 9 is a perspective view of a base frame and a main frame as viewed from a rear side of an apparatus.

Next, with reference to FIG. 9 and subsequent figures, other configurations of the printer 1 will be described. As shown in FIG. 9, the base body of the printer 1 is formed by the base frame 30. The base frame 30 is a large frame that occupies most of the occupied area of the printer 1 when viewed in plan view, and the entire base frame 30 is integrally formed of a resin material. The main frame 24 described above extends in the X axis direction, and the length in the X axis direction of the main frame 24 is substantially the same as that of the base frame 30.

Figure 10:
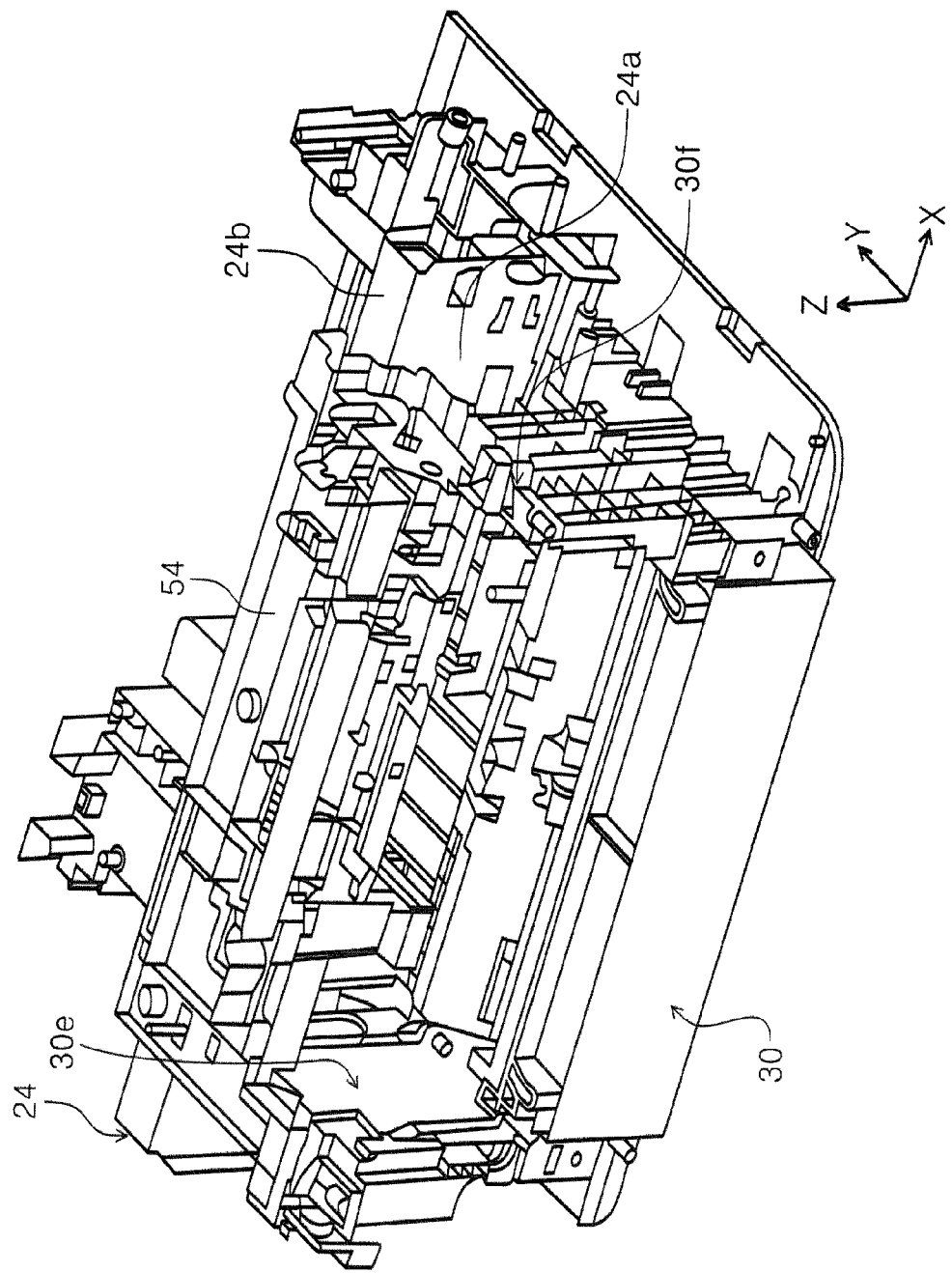
FIG. 10 is a perspective view of a base frame, a main frame, and a holding frame as viewed from a rear side of an apparatus.

In the base frame 30, side frame units 30e and 30f extend upward in the +Z direction from the lower part of the base frame 30 behind the position where the main frame 24 is mounted. The side frame units 30e and 30f are provided at a predetermined interval in the X axis direction, and, as shown in FIG. 10, a holding frame 54 constituting the reading mechanism unit 3 is joined to the upper end of the side frame units 30e and 30f. With this configuration, the holding frame 54 prevents the side frame units 30e and 30f from collapsing in the X axis direction, and generally improves the rigidity as the frame.

Figure 11:
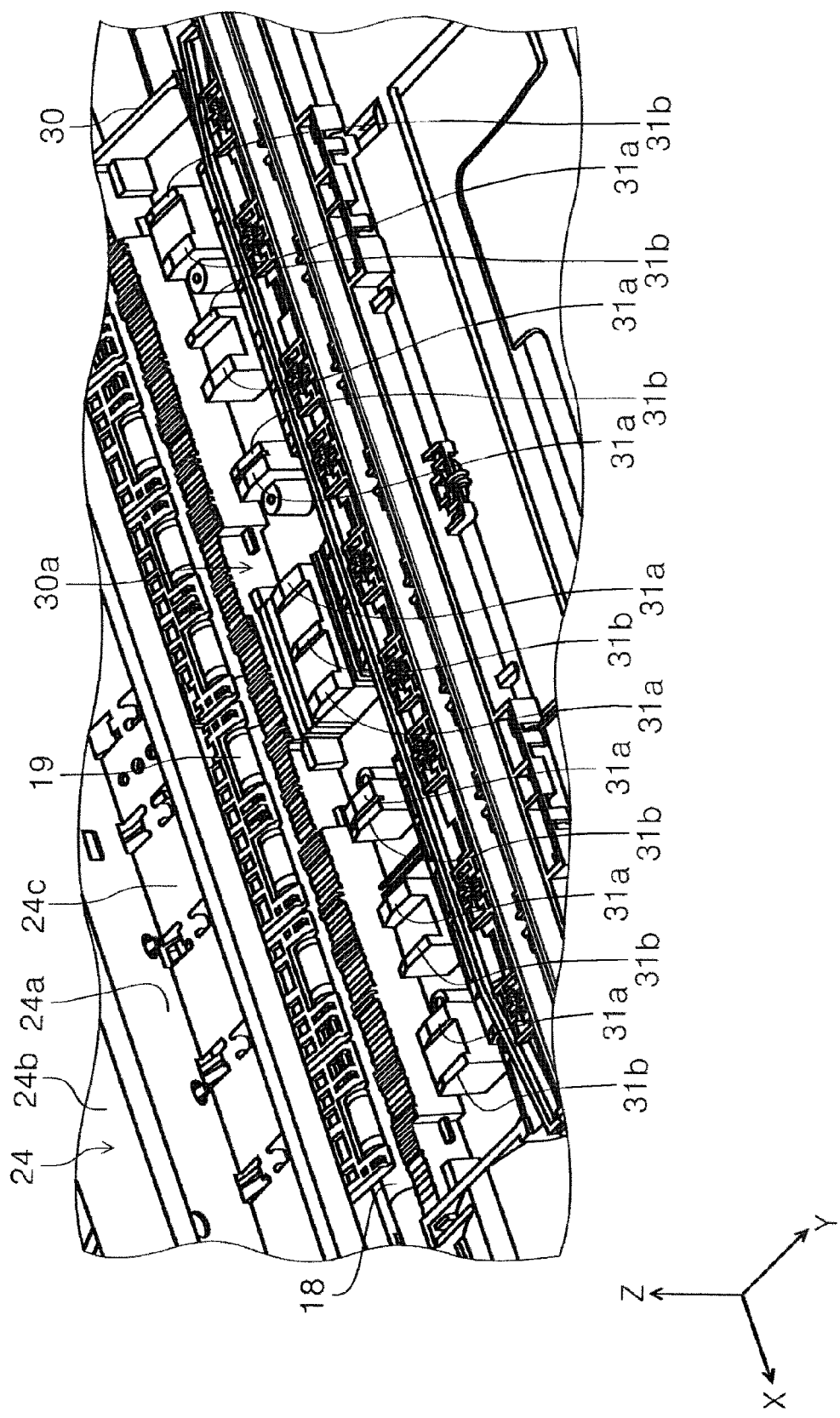
FIG. 11 is a perspective view of a first support rib, a second support rib, and a recess.

Next, with reference to FIGS. 11 to 13, the support rib 31 described in connection with FIG. 3 will now be described. More specifically, the support rib 31 of the present embodiment is composed of a first support rib 31a, a second support rib 31b, and a third support rib 31c. Among these, the first support rib 31a and the second support rib 31b are integrally formed with the base frame 30 as shown in FIG. 11. Accordingly, the accuracy in the height of the first support rib 31a and the second support rib 31b in the Z axis direction is ensured.

In particular, the first support rib 31a has the largest height in the Z axis direction among the three support ribs, and the second support rib 31b has second largest height in the Z axis direction. The third rib 31c has a lower height in the Z axis direction compared with that of the other ribs. That is, an interval between the recording paper and the recording head 22 is regulated mainly by the first support rib 31a and the second support rib 31b that are integrally formed with the base frame 30.

Figure 12:
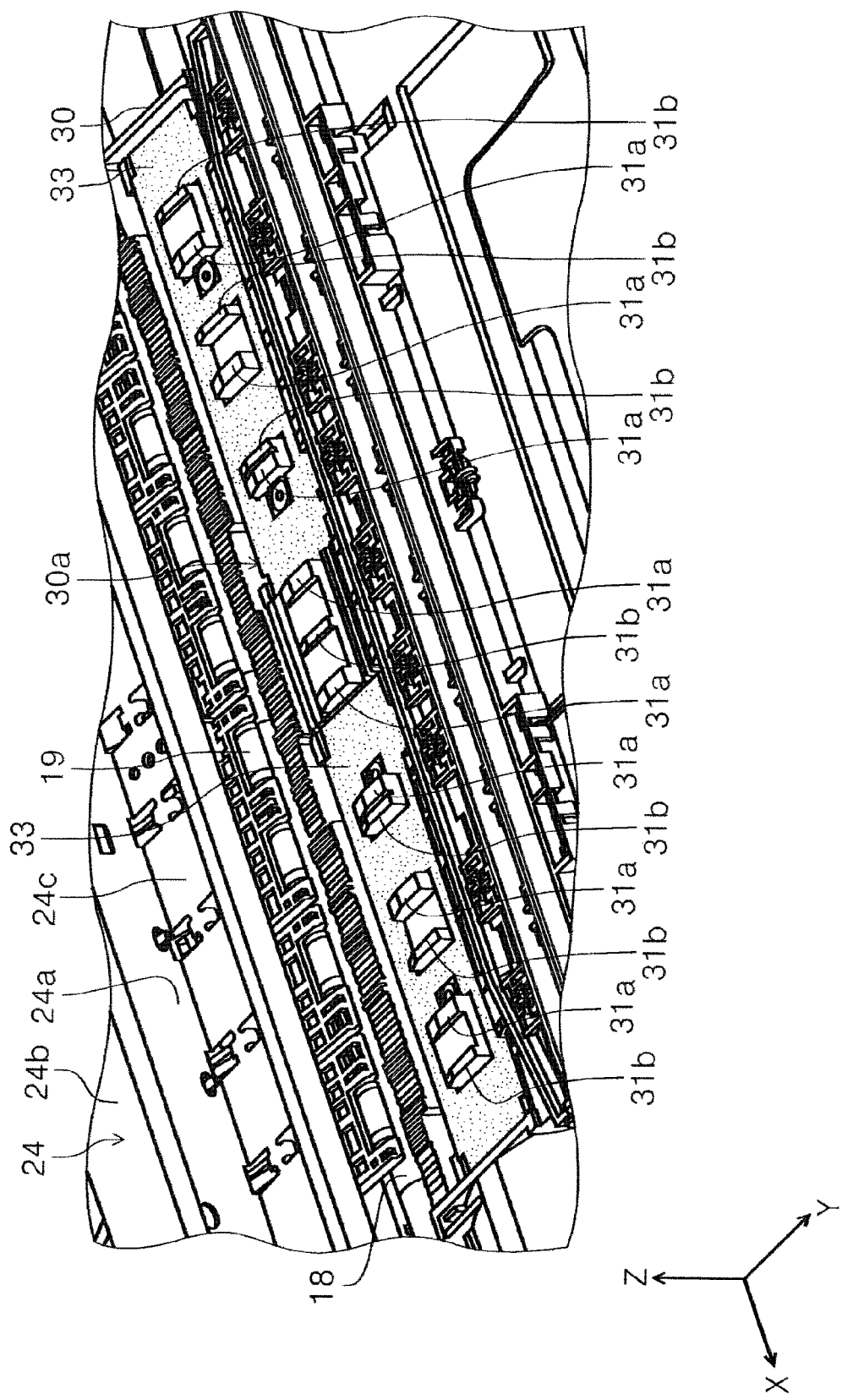
FIG. 12 is a perspective view illustrating that an absorber is provided in a recess of FIG. 11.

Further, as shown in FIG. 11, a recess 30a is formed around the first support rib 31a and the second support rib 31b in the base frame 30, and, as shown in FIG. 12, an absorber 33 for absorbing ink is disposed in the recess 30a. The absorber 33 absorbs ink ejected outside the edge of a recording paper when recording is performed without margins onto the recording paper.

Figure 13:
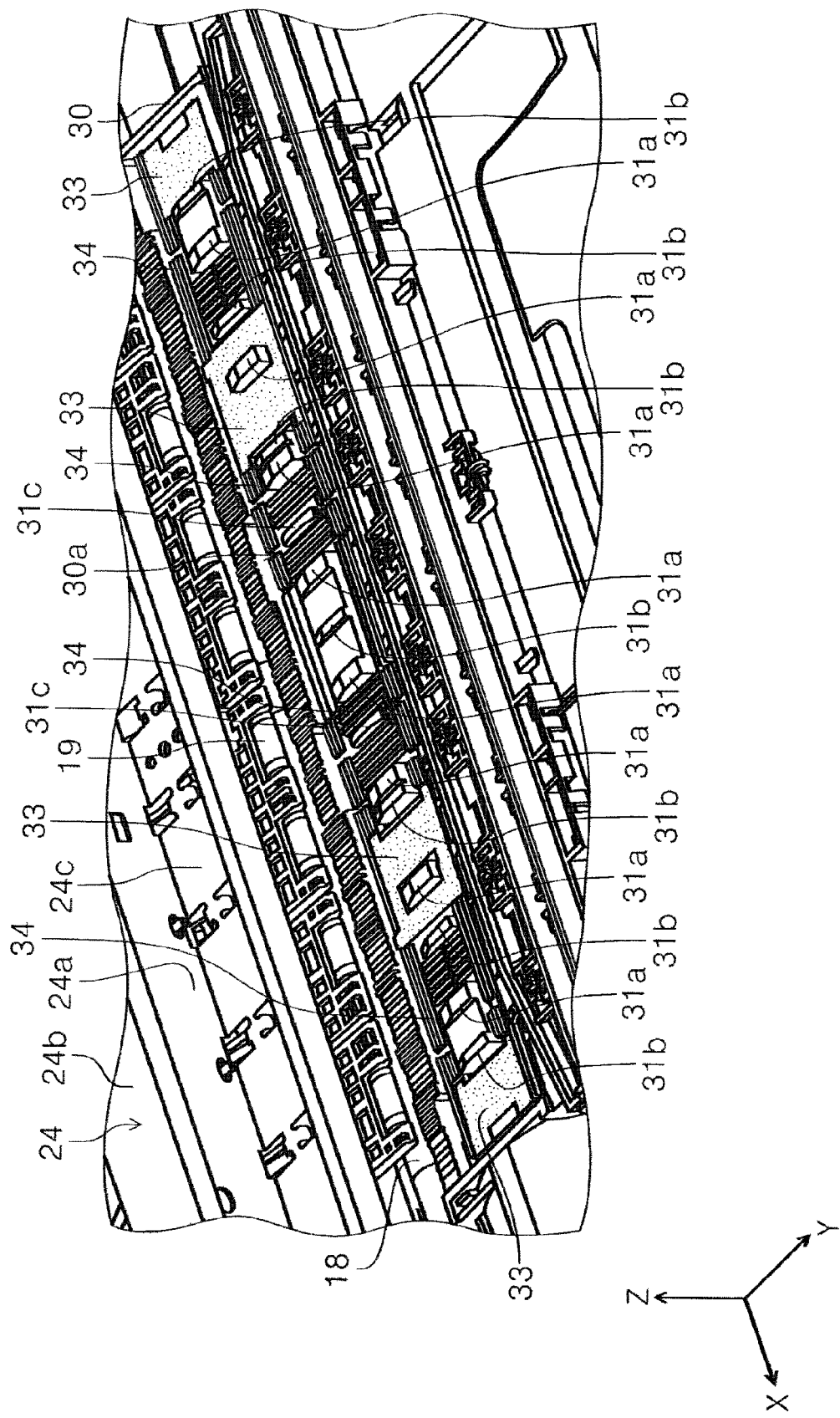
FIG. 13 is a perspective view illustrating that a cover member is further provided in FIG. 12.

After the absorber 33 is disposed in the recess 30a, a cover member 34 is provided above a part of the absorber 33 as shown in FIG. 13. The third support rib 31c having the smallest height in the Z axis direction is formed on the cover member 34. The third support rib 31c is provided mainly for preventing a recording paper from coming into contact with the absorber 33. Since it does not directly affect the recording quality, an appropriate recording quality can be maintained even if a slight error in the height in the Z axis direction occurs due to the third support rib 31c being formed on the cover member 34. Since the third support rib 31c is not integrally formed with the base frame 30, an installation area of the absorber 33 can be increased. Accordingly, an increased volume of the absorber 33 enables an increased volume of ink that can be absorbed.

Figure 14:
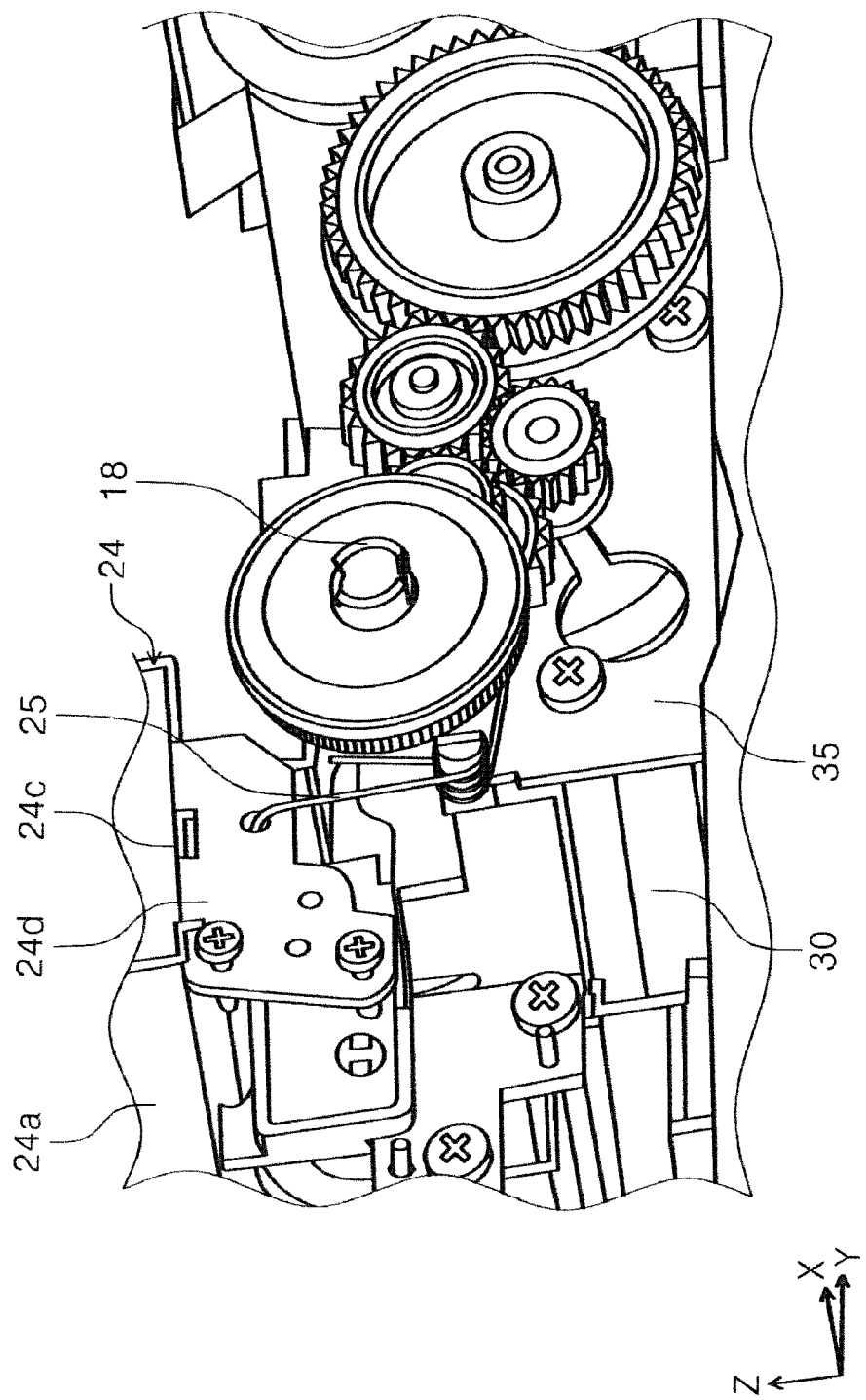
FIG. 14 is a perspective view of a driving roller and a roller support frame.

FIG. 14 illustrates a roller support frame 35 that supports the +X end of the driving roller 18 constituting the transport roller pair 17 described in connection with FIG. 3. The roller support frame 35 is made of a metal plate material, that is, an electrically conductive material as with the main frame 24. The end of the main frame 24 in the +X direction has a folded section 24d protruding in the −Z direction, and a coil spring 25 made of a metal material is hung between the folded section 24d and the roller support frame 35. The roller support frame 35 is electrically connected to a ground terminal of a circuit board, which is not shown. With this configuration described above, the main frame 24 is grounded with a small number of parts.

The present disclosure is not limited to the aforementioned embodiments. Various modifications can be made within the scope of the disclosure defined by the appended claims, and such modifications should be included in the scope of the disclosure.

What is claimed is:

1. A recording apparatus comprising:
    an apparatus main body having a recording unit that performs recording onto a recording medium; and
    a document reading mechanism unit having a reading unit that reads a document and a document transport unit that transports a document to the reading unit, the document reading mechanism unit being provided in an upper part of the apparatus main body, wherein
    the apparatus main body includes: a feed roller that feeds the recording medium toward the front of the apparatus; and
    a frame having a frame surface intersecting the horizontal direction, the frame being located between the recording unit and the feed roller in an apparatus depth direction, and the frame being stationary with respect to the apparatus main body, and
    a part of the document reading mechanism unit overlaps the feed roller in the apparatus depth direction, and overlaps the frame in the vertical direction.

2. The recording apparatus according to claim 1, wherein the recording unit is provided in a carriage that is movable in a width direction, which is a direction intersecting a transport direction of the recording medium, and
the frame supports the carriage.

3. The recording apparatus according to claim 1, wherein the reading unit overlaps the feed roller in the apparatus depth direction, and overlaps the frame in the vertical direction.

4. The recording apparatus according to claim 3, wherein
    the reading unit includes a substrate on which a light emitting element and a light receiving element are provided, and
    the substrate overlaps the feed roller in the apparatus depth direction, and overlaps the frame in the vertical direction.

5. The recording apparatus according to claim 1, wherein
    the document reading mechanism unit includes a holding member that holds the reading unit, and
    the holding member overlaps the feed roller in the apparatus depth direction, and overlaps the frame in the vertical direction.

6. The recording apparatus according to claim 5, wherein
    the document reading mechanism unit includes an output document receiving tray that receives the document that is read and outputted, and
    a lowermost part of the holding member in the vertical direction is located under a document receiving surface of the output document receiving tray.

7. The recording apparatus according to claim 1, wherein
    the document reading mechanism unit includes an output document receiving tray that receives the document that is read and outputted,
    the apparatus main body includes a recording medium support tray that supports the recording medium fed by the feed roller in an inclined posture, and
    a part of the recording medium support tray overlaps the output document receiving tray in the vertical direction.

8. The recording apparatus according to claim 1, wherein
    the apparatus main body includes a tilt panel on a front of the apparatus, and
    a part of the document reading mechanism unit overlaps the tilt panel in the vertical direction.

9. The recording apparatus according to claim 1, wherein
    the document reading mechanism unit includes a document support section that supports the document, the document support section being located upstream in a direction in which a document is transported by the document transport unit, and
    a top of the apparatus main body forms an extension surface extending a document support surface of the document support section toward the front of the apparatus.

10. The recording apparatus according to claim 9, wherein,
    in the document reading mechanism unit, the document is read by the reading unit while being transported in a direction from the front to the rear of the apparatus main body, and is outputted in the first direction, and,
    in the apparatus main body, the recording medium is recorded on by the recording unit while being transported in a direction from the rear to the front of the apparatus main body, and is outputted to the front of the apparatus main body.

* * * * *